United States Patent
Engbring et al.

(10) Patent No.: US 8,043,108 B2
(45) Date of Patent: Oct. 25, 2011

(54) HIGH VOLTAGE PLUG-CONNECTOR FOR MOTOR VEHICLES

(75) Inventors: Jürgen Engbring, Iphofen (DE); Volker Albert, Dettelbach (DE); Christian Kuschnarew, Würzburg (DE); Volker Hartmann, Castell (DE); Peter Bucher, Würzburg (DE)

(73) Assignees: LEONI Bordnetz-Systeme GmbH, Nuremberg (DE); Continental Automotive GmbH, Hannover (DE)

( * ) Notice: Subject to any disclaimer, the term of this patent is extended or adjusted under 35 U.S.C. 154(b) by 0 days.

(21) Appl. No.: 12/981,636

(22) Filed: Dec. 30, 2010

(65) Prior Publication Data

US 2011/0151715 A1 Jun. 23, 2011

Related U.S. Application Data

(63) Continuation of application No. PCT/EP2009/004624, filed on Jun. 26, 2009.

(30) Foreign Application Priority Data

Jun. 30, 2008 (DE) .......................... 10 2008 030 339

(51) Int. Cl.
*H01R 13/627* (2006.01)
(52) U.S. Cl. ....................................... 439/352; 439/135
(58) Field of Classification Search .................. 439/135, 439/149, 347, 350, 352, 488, 489, 924.1, 439/924.2
See application file for complete search history.

(56) References Cited

U.S. PATENT DOCUMENTS

| 4,775,327 | A | 10/1988 | Normann et al. |
| 5,940,560 | A | 8/1999 | De Marchi et al. |
| 7,084,361 | B1 | 8/2006 | Bowes et al. |
| 7,892,011 | B2 * | 2/2011 | Beer .............................. 439/347 |
| 2001/0039135 | A1 | 11/2001 | Tamura et al. |

FOREIGN PATENT DOCUMENTS

| DE | 199 52 023 A1 | 5/2001 |
| DE | 103 41 136 A1 | 4/2005 |
| DE | 10 2006 016 137 A1 | 10/2007 |
| DE | 10 2006 047 039 A1 | 11/2007 |
| EP | 0 838 702 A1 | 4/1998 |
| WO | 00/67055 A1 | 11/2000 |
| WO | 2007/113117 A1 | 10/2007 |

* cited by examiner

*Primary Examiner* — Khiem Nguyen
(74) *Attorney, Agent, or Firm* — Laurence A. Greenberg; Werner H. Stemer; Ralph E. Locher

(57) ABSTRACT

A high voltage plug-connector for the detachable electric connection of high voltage components, particularly an electric drive system of a motor vehicle, has a plug with electric power contacts, a socket with a mating contacts for mating with the power contacts, and a signal plug that interacts with signal contacts for activating the high voltage. The signal plug locks the plug and the socket mechanically in their plug-in position. The mechanical plug-connector has a pre-latching position in which the signal plug is guided to a releasing position and the electric contact between the power contacts and mating contacts can be released. The mechanical lock is released only when the electric contact between the power contacts and the mating contacts is opened and the signal plug is guided to a cover position in which the signal plug covers the power contacts.

6 Claims, 2 Drawing Sheets

HIGH VOLTAGE PLUG-CONNECTOR FOR MOTOR VEHICLES

CROSS-REFERENCE TO RELATED APPLICATION

This application is a continuation, under 35 U.S.C. §120, of copending international application No. PCT/EP2009/004624, filed Jun. 26, 2009, which designated the United States; this application also claims the priority, under 35 U.S.C. §119, of German patent application No. DE 10 2008 030 339.9, filed Jun. 30, 2008; the prior applications are herewith incorporated by reference in their entirety.

BACKGROUND OF THE INVENTION

Field of the Invention

The invention relates to a high-voltage plug connection for the detachable electrical connection of high-voltage components, in particular of an electrical drive system of a motor vehicle. The connector has a plug with electrical power contacts and a jack with a mating contact corresponding to the power contacts.

The term "high-voltage components" are understood to mean, in particular, the devices and assemblies of an electrical drive system of a motor vehicle (hybrid drive, hybrid vehicle, electric vehicle, or fuel cell vehicle).

An electrical drive system of a drive configuration in a motor vehicle with at least one electrical machine (synchronous or asynchronous machine) has high-voltage components or assemblies, which are also referred to below as high-voltage devices, with voltages of at present even greater than 300V (greater than $60V_{DC}$, greater than $25V_{AC}$). These include in particular also power control elements, such as inverters, current converters and/or power converters, a control unit or ECU (electronic controller unit).

The high-voltage system comprising the high-voltage devices and a high-voltage battery feeding the devices is generally protected by means of access protection or protection against electric shock in order to avoid a risk of injury in the event of touching contact being made with the high-voltage assemblies conducting the high voltage. It is thus necessary to ensure protection against electric shock with respect to a high voltage which is still available at the motor terminals of the electric machine, for example in the case of a disconnected drive system and still-rotating machine.

When releasing plug-type contacts or contact connections known, for example, from German published patent application DE 10 2006 047 039 A1 and when opening the machine housing of the electric machine or the device housing of the electronic control unit containing the power control elements, it is also necessary to ensure a reduction in the high voltage for a very short period of time. Owing to the high currents to be transmitted and the safety requirements with respect to protection against electric shock and in terms of prescribed air and leakage parts, such high-voltage plug-type connections have a particularly large design.

As regards the protection against electric shock, it is possible to implement this feature mechanically, with the result that it is not possible for the probe to come into contact with live parts. Thus, the corresponding plug, jack or contact openings which enable access to the live parts can be configured to be so small that a probe does not reach the live parts.

If a high-voltage monitoring circuit (hazardous voltage interlock loop, HVIL) is provided, the safety system can be designed such that there is a time span between the opening of the monitoring circuit and the possibility of access to live parts, within which time span existing stores of high voltage are discharged to a safe level. In this case, the monitoring circuit can be implemented by HVIL signal plugs with in each case two contacts, which can be plugged into the terminal boxes of the electrical machine, for example. This signal plug can be connected fixedly to a high-voltage or power plug, which conducts the high power currents of the high-voltage system, or locked in such a way that first the signal plug needs to be disconnected before the power plug can be detached, i.e. disconnected from the respective high-voltage component.

Alternatively, the power plug could carry along the HVIL contacts such that said contacts are necessarily opened in advance of the power contacts when the connection is detached in order to ensure the desired or required intrinsic safety. This would mean that first the high voltage is disconnected and the energy stores are discharged, with the exception of existing vehicle batteries, before the power contacts are accessible to the probe.

For failsafeness of the mechanical plug-type connection (connector position assurance, CPA), a primary lock should ensure that, for example, latching only takes place when the electrical contacts have been plugged correctly and therefore the electrical connection has been produced without any faults. In order to prevent the primary lock from being released automatically, a manually actuated secondary lock can be plugged (clipped, snapped, or latched) onto this primary latch.

SUMMARY OF THE INVENTION

It is accordingly an object of the invention to provide a high-voltage plug-type connection which overcomes the above-mentioned disadvantages of the heretofore-known devices and methods of this general type and which enables, in a simple manner, reliable protection against electric shock. In particular, in the plugged-in state of the high-voltage plug-type connection, the intention is for it to be ensured that the electrical connection is produced and not detached unintentionally.

With the foregoing and other objects in view there is provided, in accordance with the invention, a high-voltage plug connection for a detachable electrical connection of high-voltage components, in particular for an electrical drive system of a motor vehicle. The assembly comprises:

a plug with electrical power contacts;

a jack with a mating contact corresponding to said power contacts;

a signal plug configured to interact with signal contacts for activating the high voltage and to mechanically lock said plug and said jack in a plugged-in position thereof;

a mechanical connection between said plug and said jack having a prelatching position, in which said signal plug is guided into a release position and an electrical contact between said power contacts and said mating contacts can be detached; and a mechanical lock between said plug and said jack only being unlocked when the electrical contact between said power contacts and said mating contacts opens and said signal plug is guided into a covering position, in which said signal plug covers said power contacts.

In addition, the high-voltage or HV plug-type connection referred to below as the plug-type connection comprises, in addition to the plug and the jack, a signal plug, which mechanically locks the plug and the jack in the plugged-in position thereof. The signal contacts of the signal plug interact with corresponding mating contacts so as to activate the high voltage as so-called HVIL contacts. The mechanical connection between the plug and the jack comprises a prelatching position, in which the signal plug is released and the electrical contact between the power contacts and the mating contacts can be detached. This means that the electrical contact can only be opened when the HV plug-type connection has assumed this prelatching position. The HV plug-type connection can only be moved over into this prelatching position when the signal plug has been brought out of the locking position into the release position.

The mechanical lock which is produced between the plug and the jack and prevents the HV plug connection from being opened completely even in the prelatching position is only unlocked when both the electrical contact is open and the signal plug has been moved out of the prelatching position into a release position. In this release position, which is preferably in the form of a separate plugged-in position for a signal plug which is in the form of a key or acts as a key, this signal plug covers the power contacts so as to provide protection against electric shock. For this purpose, the power contacts are in the form of male contacts and therefore the mating contacts are in the form of female contacts, in a suitable manner.

The invention is based on the concept that the protection against electric shock does not need to be ensured by correspondingly small plug, jack or contact openings if it is ensured that the power plug can be disconnected only when all of the live contacts are covered mechanically and, in the process, the protection against electric shock is automatically produced. For this purpose, it is not necessary for additional functional parts to be provided if this task is performed as an additional function by the HVIL plug. Said HVIL plug then performs the dual function of protection against electric shock and failsafeness of the mechanical plug-type connection (CPA).

In accordance with an expedient configuration, the plug-type connection, i.e. in particular the plug or the jack, has a housing (plug-type housing) with preferably two housing chambers, into which the signal plug or key can be inserted when the prelatching position is produced in the plugged-in position thereof, on the one hand, and in the release position thereof, on the other hand. In this case, the power contacts are preferably surrounded by a plug-type housing with at least one contact-making opening, which is sealed so as to provide protection against electric shock in the release position of the signal plug.

The advantages achieved by the invention consist in particular in that, by virtue of the provision of a prelatching position for the involved power plugs of a high-voltage plug-type connection, on the one hand, and the use of a signal plug in the form of a key for unlocking, releasing the contact opening and cover of power contacts which are not sealed so as to provide protection against electric shock, on the other hand, the functionalities of the protection against electric shock, the failsafeness of the mechanical plug-type connection (CPA), the HVIL safety functionality and the key function for locking and unlocking the plug-type connection are combined in a logical and necessarily predetermined sequence.

Other features which are considered as characteristic for the invention are set forth in the appended claims.

Although the invention is illustrated and described herein as embodied in a high voltage plug-connector for motor vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
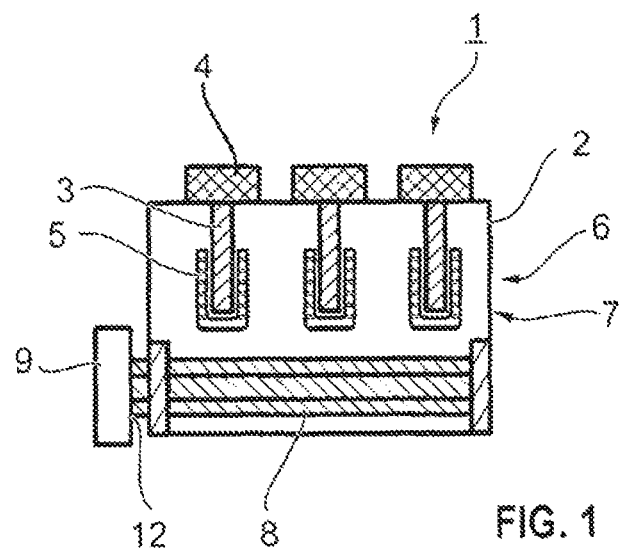
FIGS. 1 to 3 show schematics of a plan view of a high-voltage plug-type connection with a signal plug as the locking and unlocking key in the plugged-in position, in the prelatching position of the plug-type connection and in the completely isolated position of the plug-type connection, respectively.

Referring now to the figures of the drawing in detail, in which mutually corresponding parts have been provided with the same reference symbols throughout, and first, particularly, to FIG. 1 thereof, there is shown a high-voltage or HV plug-type connection or plug connector 1 which comprises a housing (plug-type housing) 2, in which three high-voltage or power contacts 3 are positioned in the exemplary embodiment. The contacts 3 are connected to conductors or conductor wires 4 of a supply or power cable (not illustrated in any more detail). The power cable is integrated in a high-voltage system of a vehicle with an electrical drive system, for example.

In the plug-type connection or plug connector shown in FIG. 1, corresponding mating contacts 5 are connected electrically conductively to the contacts 3 in the plugged-in position. These mating contacts 5 are in the form of female contacts in the exemplary embodiment, while the contacts 3 are in the form of male contacts. Accordingly, the contacts are assigned to a plug (HV plug) 6 of the plug-type connection 1 in the exemplary embodiment, while the female contacts 5 are assigned to a jack 7 of the plug-type connection 1.

In addition, the plug-type connection 1 has a signal plug 8, which is referred to below as an HVIL plug. The latter interacts with device-side or component-side signal contacts 9 in the plug-type connection which is completely closed and in which electrical contact has been made. In the plugged-in position illustrated in FIG. 1, the HVIL plug 8 is in the locking position. In the locking position, the plug 6 and the jack 7 of the plug-type connection 1 are prevented from opening mechanically and are therefore secured.

Figure 2:
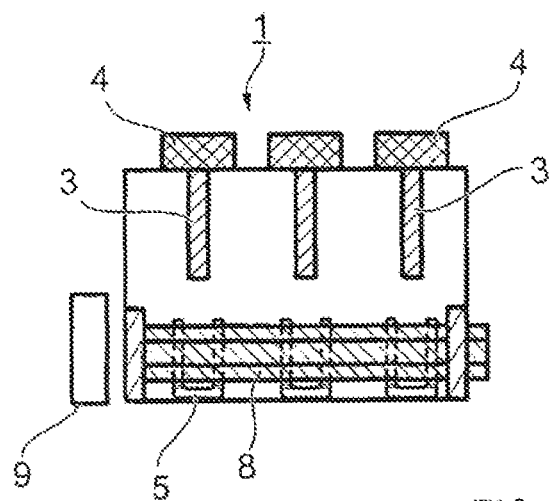

In the release position of the HVIL plug 8 illustrated in FIG. 2, the electrical contact between the male contacts 3 and the female contacts 5 can be opened. In the release position of the HVIL plug 8, however, the plug 6 and the jack 7 of the plug-type connection 1 can only be brought into a mechanical prelatching position, in which the contacts 3, 5 or existing contact openings with respect to the contacts 3, 5 are covered or sealed so as to prevent electric shock.

Figure 3:
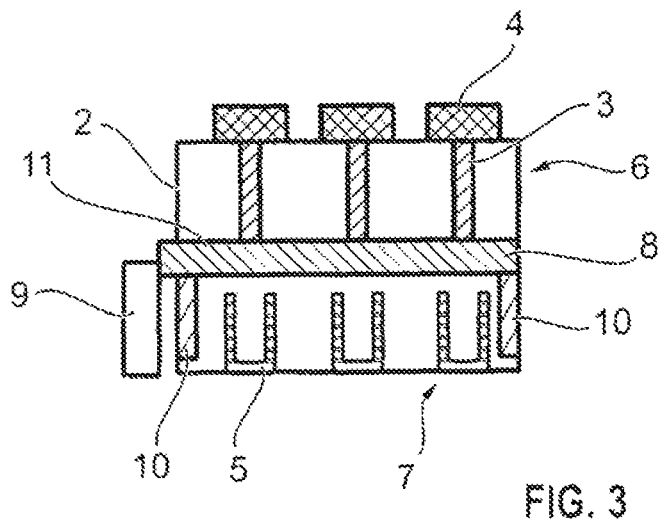

FIG. 3 shows the plug-type connection 1 with an HVIL plug 8 that has been brought into a covering position. In addition, said plug has been withdrawn from the release position illustrated in FIG. 2 in the manner of a locking and unlocking key and has been plugged into the covering position. In this case, a first housing chamber illustrated by the housing elements 10 is provided for the release position and a second housing chamber 11 for the covering position.

Figure 4:
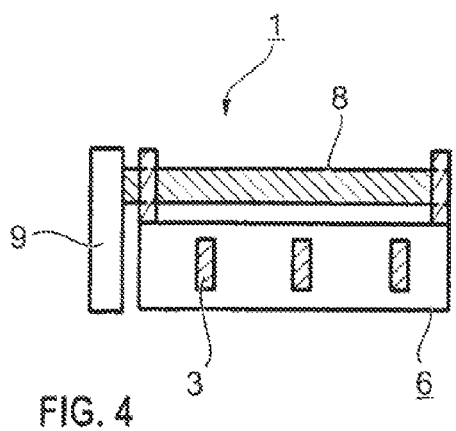
FIGS. 4 and 5 show the plug-type connection shown in FIG. 1 in a front view of the plugged-in view and in a side view, respectively.
Figure 5:
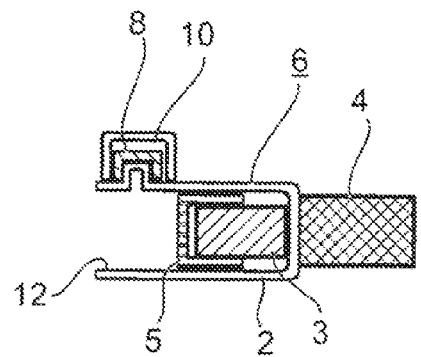
Figure 6:
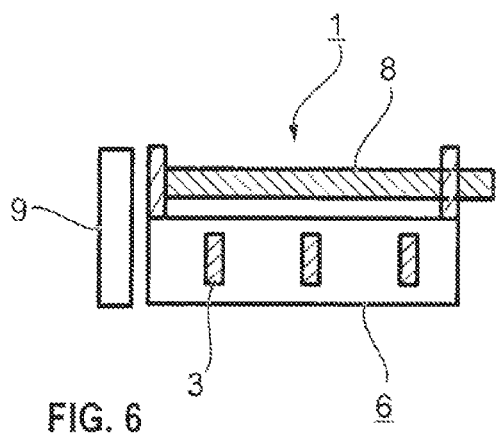
FIGS. 6 and 7 show the plug-type connection shown in FIG. 2 in a front view and a rear view, respectively.
Figure 7:
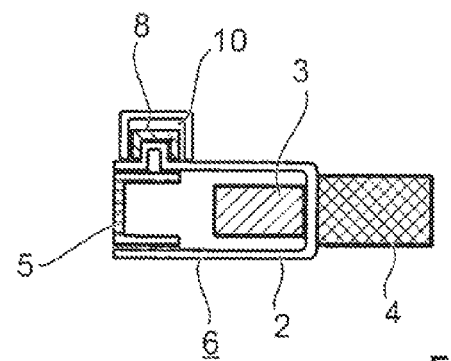
Figure 8:
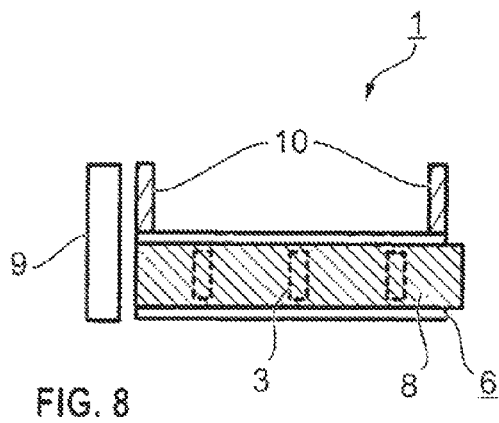
FIGS. 8 and 9 show the plug-type connection shown in FIG. 3 in a front view and a side view, respectively, with the male contacts covered.
Figure 9:
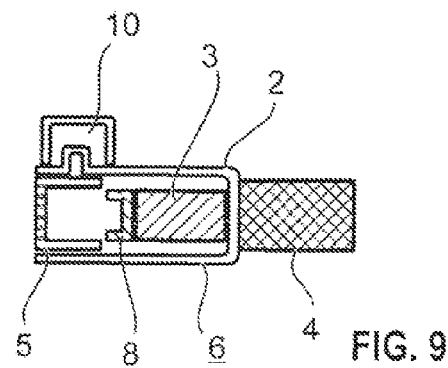

FIGS. 4, 6 and 8 show, with a view of the end sides of the male contacts 3, and therefore of the plugged-in view of the plug 6, the HVIL plug 8 in the locking position thereof (FIG. 4), in the release position thereof (FIG. 6) and in the covering position thereof (FIG. 8). FIGS. 5, 7 and 9 show the plug-type connection 1 likewise in these positions of the HVIL or signal plug 8 and the associated mechanical joining positions and electrical contact-making positions of the plug 6 and the jack 7 or the male and female contacts 3, 5.

As can be seen comparatively clearly from FIGS. 5, 7 and 9, the plug-type housing 2 has a plug-type or joining opening (contact-making opening) 12 which opens out into a joining area and is closed off so as to protect against electric shock, as shown in FIG. 9, before the female contact 5 together with the jack 7 releases this joining opening 12 and therefore makes it accessible to a probe.

Starting from the initial situation illustrated in FIGS. 3, 8 and 9, in which the plug-type connection 1 is electrically isolated, the power contacts 3 are protected against electric shock by way of the HVIL plug 8 which acts as a key. In this state of the plug-type connection 1, the HV plug 6 can be brought merely into the prelatching position illustrated in FIGS. 2, 6 and 7. In this prelatching position, the signal plug 8 is free and can be removed from the housing or locking chamber 10, which virtually acts as a lock. Only in this state is it possible for the HV plug 6 to be brought out of the prelatching position shown in FIG. 2 into the plugged-in position shown in FIG. 1. In this case, the HV plug 6 releases the plug-type opening 12 (FIGS. 1 and 4) for joining the signal plug 8 into the locking position for producing the CPA protection.

For reliable avoidance of hazards, it is ensured that the HV plug 6 can no longer be removed from the storage position thereof once the key or signal plug 8 has been drawn. The signal plug 8 can now be plugged into the CPA position illustrated in FIGS. 1, 4 and 5 and locked, therefore simultaneously with the HV plug 6. In this case, the signal plug 8 includes the CPA function and the HVIL function.

For the unlocking operation, in turn initially the HVIL plug 8 is detached and as a result the discharging operation is initiated, whereupon the CPA functionality is now free and can be released. Once the CPA functionality has been released, the HV plug 6 of the plug-type connection 1 can be brought into the prelatching position (FIGS. 2, 6 and 7), but not completely disconnected. In order to be able to completely draw the HV plug 6, the signal plug 8 needs to be inserted into a lock at another point, which is illustrated in the exemplary embodiment by the corresponding housing chamber 11. In this position, the signal plug 8 with its functionality as a key, covers the HV contacts 3 so as to protect against electric shock. In this covering position of the signal plug 8, the prelatching position of the HV plug 6 is completely unlocked, with the result that said HV plug 6 can now be completely disconnected. Instead of the covering of the male contacts 3, it is also possible for the female contacts 5 to be covered.

The described protection against electric shock can also be used as transportation securing means since the lock remains in existence until the HV plug 6 is reintroduced into the prelatching position (FIGS. 2, 6 and 7).

The invention claimed is:

1. A high-voltage plug connection for a detachable electrical connection of high-voltage components, comprising:
    a plug with electrical power contacts;
    a jack with a mating contact corresponding to said power contacts;
    a signal plug configured to interact with signal contacts for activating the high voltage and to mechanically lock said plug and said jack in a plugged-in position thereof;
    a mechanical connection between said plug and said jack having a prelatching position, in which said signal plug is guided into a release position and an electrical contact between said power contacts and said mating contacts can be detached; and
    a mechanical lock between said plug and said jack only being unlocked when the electrical contact between said power contacts and said mating contacts opens and said signal plug is guided into a covering position, in which said signal plug covers said power contacts.

2. The high-voltage plug connection according to claim 1, configured for an electrical drive system of a motor vehicle.

3. The high-voltage plug connection according to claim 1, wherein said signal plug is an HVIL plug.

4. The high-voltage plug connection according to claim 1, wherein said plug or said jack includes a plug housing formed with at least one housing chamber for receiving said signal plug into at least one of the release position and/or the covering position.

5. The high-voltage plug connection according to claim 1, wherein said power contacts are male contacts and said mating contacts are female contacts.

6. The high-voltage plug connection according to claim 1, which comprises a plug housing enclosing said power contacts, said plug housing having at least one joint opening that is sealed so as to provide protection against electric shock in the covering position of said signal plug.

* * * * *